United States Patent Office 3,025,135
Patented Mar. 13, 1962

3,025,135
LOW ACID PURIFIED TITANIUM SOLUTION AND PRODUCTS THEREFROM
Lester A. Kenworthy, Baltimore, Md., assignor to The Glidden Company, Cleveland, Ohio, a corporation of Ohio
No Drawing. Filed June 11, 1959, Ser. No. 819,563
10 Claims. (Cl. 23—87)

This invention concerns a process for the manufacture of low acid purified titanium sulfate solutions, $TiO_2$ and $TiCl_4$. The invention is more particularly concerned with a process for treating solutions of sulfuric acid comprising soluble titanium values and metallic impurities with an ion exchange resin in order to selectively exchange and remove a majority of the metal ions present in said solutions to thereby obtain a modified solution containing non-harmful metallic salts, said solution being suitable for recovery of titanium values. Reference is made here to my copending application, Serial No. 813,643, filed May 18, 1959, which is incorporated here by reference.

In the manufacture of titanium dioxide from titanium bearing ores and slags, it is conventional to treat the crude material or mixtures thereof with sulfuric acid to obtain a digestion mass, or cake consisting largely of acid and water-soluble sulfates of titanium, iron and other minor impurities. Exemplary of some of the usual impurities are aluminum, boron, calcium, cobalt, chromium, copper, magnesium, manganese, molybdenum, sodium, nickel, selenium, vanadium, zinc and zirconium. Major impurities are usually iron, aluminum and magnesium. Of importance are also manganese, chromium and vanadium. Most of these impurities usually exist in a sulfuric acid solution in a valency state less than 4, whereas titanium is present in the tetravalent form. In practice, ilmenite ore and/or titanium bearing slags are comminuted and then reacted, at elevated temperatures, with concentrated sulfuric acid in a suitable chamber to form a cake of titanium and iron sulfates, etc. preparatory to the recovery of the titanium values either as salts or in the form of hydrous titanium oxide. The reaction cake resulting from the sulfuric acid attack comprises generally soluble titanium values, soluble ferrous, ferric and other metallic sulfates such as chromium and vanadium, unattacked ore and gangue. After the sulfuric acid attack, the reaction mixture is cooled and dissolved in aqueous media to bring into solution the acid soluble metallic values. In the ensuing processing, it is necessary, for various reasons, to subject the crude solution to a reducing treatment in order to convert the ferric iron to the ferrous state and generally a small amount of the titanium to the trivalent state. After this reduction treatment, the unattacked portion of the ore is removed, for example, by settling or by coagulating it with glue or a metallic sulfide according to well known procedures. The treatment described facilitates the subsequent recovery of the titanium values in a substantially uncontaminated condition from the clarified solution.

The treatment most prevalently used for the reduction of ferric iron in the crude solution is the scrap iron treatment to reduce it to the ferrous state and to reduce a small amount of the titanium to the trivalent state as a safeguard agains reoxidation of the ferrous iron to ferric iron during the succeeding steps of the process. The resulting liquor, contaminated with some unreacted ore, gangue and slime residues, is thereafter clarified by treating with a coagulant to give a stock titanium solution. A seeding agent in the form of a dispersed titanium-containing sol is then added to the clarified solution and heated to the boiling point to effect hydrolysis. The resulting precipitated titanium hydrate is filtered out, washed, dried, calcined and ground, being then ready for use as a pigment.

In copending application, Serial No. 813,643, filed May 18, 1959, referred to above, I have described and claimed a process for the treatment of black solutions obtained from the treatment of titaniferous ores with sulfuric acid which process essentially comprises in passing a black sulfuric acid solution containing all of the acid soluble metallic impurities normally found in said acid solutions, or equivalent solutions, however obtained, through a cation exchange resin in the hydrogen form and recovering therefrom effluent cuts consisting essentially of free sulfuric acid and subsequent effluent cuts consisting of solutions containing substantially all of the titanium. In this treatment the metallic sulfates with the exception of titanium are selectively exchanged by ion exchange with the resin, that is, hydrogen is exchanged for the metal ions with the result that the effluent solution is rich in sulfuric acid and in titanium values. The treatment described also encompasses the treatment of waste acid solutions obtained from the hydrolysis step in a $TiO_2$ manufacturing plant.

In the treatment and purification of black solutions by cation exchange resin in the hydrogen form as disclosed in said copending application, the dissolved metal sulfate salts forming part of the impurities in solution are converted to sulfuric acid and result in an initial effluent of substantially pure sulfuric acid with negligible titanium values. Subsequent cuts (in a continuous cycling process) containing the bulk of the titanium values, have a factor of acidity comparable with original feed and can be directed to recovery of $TiO_2$ values. The word "values" is used here to mean the titanium in tetravalent form in whatever chemical combination it may be present. The balance of the column effluent is made up of intermediate cuts of gradually increasing quantities of undesirable impurities and is recycled to a fresh column to reduce this level.

Effluent solutions from cation exchange resin treatment in accordance with the process of my copending application and in accordance with the process of this invention can be blended in proper proportion to give desired factor of acidity control for hydrolysis purposes as will be described below with relation to one of the objects of this invention.

Waste disposal problems can also be advantageously eliminated by the process of this invention, and accordingly, such elimination of waste materials is another object of this invention.

A prime object of my invention, however, concerns the preparation of cleaned black sulfuric acid solutions obtained from the treatment of a titanium bearing ore, slag, or mixtures thereof with sulfuric acid. Specific uses for cleaned black solutions of sulfuric acid from the process of this invention will be enumerated hereinafter.

Another object of my invention is the preparation of titanium tetrachloride suitable for hydrolysis to $TiO_2$.

Other objects will be recited hereinafter or will be apparent from a description of this invention.

I accomplish the objects of my invention enumerated above by my discovery that I can clean a black sulfuric acid solution obtained from the treatment of titaniferous ores with sulfuric acid, by contacting said solution with a water-insoluble, acid-resisting cation exchange resin, the ion exchange portion of the resin being in the form of an ion selected from the group consisting of the alkali metals, magnesium and ammonium, to thereby exchange some metallic salt impurities in said solution for the ion on the resin and recovering from said contact a solution containing a soluble cation salt (the salt of the cation belonging to the ionic specie originally present in the ion exchange resin) and substantially all the titanium values.

In accordance with the foregoing, my invention, in one important application thereof, relates to a process for cleaning a sulfuric acid solution obtained from the reaction of sulfuric acid with titanium bearing materials by contacting said solution with a cation exchange resin in preferably the sodium or potassium form, thereafter recovering as an effluent solution from contact with said resin, a solution containing sodium or potassium bi-sulfate and titanium and being substantially free of the other contaminating impurities.

The invention demonstrates the feasibility of removing colored and troublesome impurities from black solution with a cation exchange resin in the sodium, potassium, lithium, magnesium or ammonium form.

By the process of my invention, a wide latitude of factor of acidity control is possible for sulfuric acid solutions containing metallic sulfate salts in solution by blending effluent solutions from contact with an ion exchange resin of this invention with solutions obtained from treatment of black liquor with cation exchange resins in the hydrogen form.

I have discovered that a cation exchange resin in the form of a metal such as sodium, exerts a unique and selective exchange of metallic ions other than titanium from sulfuric acid solutions comprising salts of various metals and beneficially exchanges some hydrogen from the acid solution for sodium ions so that on contacting said acid with the resin, the resin exchanges objectionable metallic ions which would be detrimental to hydrolysis, but does not remove the titanium values from the solution. In addition to this effect, the sodium (or other ionic specie mentioned above) exchanges for some hydrogen ion in the acid solution so that the free acid content of such solutions is beneficially reduced, thereby resulting in a solution more suitable for hydrolysis by virtue of such reduced free acid content.

Since the process of this invention is concerned chiefly with cleaning up black sulfuric acid solutions as described generally above, it will be understood that the clean solutions can be used for a variety of purposes, including: (1) production of $TiCl_4$ or $K_2TiCl_4$; (2) chemical hydrolysis and (a) preparation of rutile seed via orthotitanic acid or sodium titanate methods, (b) finished pigment treatment and (c) gel seed production; (3) thermal hydrolysis and factor of acidity control and (4) other uses such as the preparation of titanous and titanium derivatives. A description of some of these uses will be found in this specification.

In another important application of the process of this invention, I have found that by providing, for example, a series of columns containing cation exchange resins in the hydrogen form and in the ionic form disclosed for this invention, e.g. sodium, I can blend effluent solutions, say clean black solutions of undesirably low factor of acidity from a cation exchange resin in the sodium form, with effluent solutions from the cation exchange resin in the hydrogen form in proper proportions to give the desired factor of acidity.

It is not practical here to describe in detail, nor with any substantial accuracy, the proper factor of acidity that is best for all feed composition since for each feed composition there is an optimum factor of acidity which gives the best yield consistent with satisfactory product quality. Thus, since even starting black sulfuric acid solutions are suitable for hydrolysis, even though the hydrolysate would not be in a high state of purity (because of the contaminated solution), it is sufficient here to describe and point out how to obtain cleaned effluent solutions which can be blended with solutions obtained by the process of my copending application Serial No. 813,643, filed May 18, 1959, for the purpose of obtaining solutions more suitable for hydrolysis as will be understood by those skilled in the art.

In a still further application of the process of this invention, I employ an ion exchange resin in the potassium form, to obtain an effluent solution of a potassium salt and titanium, which solution upon saturation with hydrogen chloride, precipitates potassium chlorotitanite ($K_2TiCl_6$) which can be recovered and heated, say, at temperatures of 300° to 500° C., to yield titanium tetrachloride and potassium chloride. A process is encompassed herein by this embodiment of my invention whereby titanium tetrachloride can be hydrolyzed with steam for $TiO_2$ recovery (rutile-type) and salvage of HCl. Also a continuous process is encompassed, as will be described hereinafter, wherein a plurality of cation exchange resin columns are employed in a continuous process and all by-products are recovered and re-used within the scope of the treatment.

The solutions obtained by treatment in accordance with this invention yield a very high quality titanium dioxide, whether of the rutile or anatase form.

Although I have included metals of the alkali group as those that can be present and bound to the cation exchange resin applicable in the process of this invention, I prefer to employ the resin in the sodium form in that aspect of my invention wherein effluent solutions from both, the resin in the alkali form and the hydrogen form, are to be blended.

Thus, one obvious advantage of my invention is immediately apparent, and that is the economy of one of the ingredients in the process, e.g. sodium. Also, by the use of a metal such as sodium, there is obtained upon exchange, a sodium bi-sulfate solution (a salt not detrimental under certain hydrolysis conditions) instead of a solution containing many metallic sulfates or strong sulfuric acid. The fact that the titanium is passed substantially completely through the resin without being exchanged for the sodium or equivalent ion was unexpected, as well as the fact that all of the impurities were exchanged for sodium and that some hydrogen ion was beneficially exchanged for sodium to lower the free acid content of the solution. This discovery, thereby makes it possible to treat black sulfuric acid solutions directly and obtain advantages enumerated in this specification.

In my copending application referred to above, it was found that when a black sulfuric acid solution was treated to remove soluble impurities therefrom by passing it through a cation exchange resin in the hydrogen form, the hydrogen substituted for the metal ion(s) in the solution, and some of the effluent solutions were considerably increased in free acid content. In the instant invention, however, when using the cation exchange resin in the form of any of the ionic species identified above, e.g. sodium, the sodium ion will be substituted or exchanged for the metal ion impurities with no increase in free acid. Moreover, the use of a cation exchange resin in the sodium form, in addition to purification of the solution, causes the exchange of some hydrogen ion from the acid present for some of the sodium present in the resin, thereby actually reducing the free acid content of the effluent. This means then, that for a solution of sulfuric acid containing, say an excess amount of free acid and obtained as an effluent from the cycling process described in my copending application, such solution can be readily blended with a solution containing substantially only sodium bi-sulfate and titanium and a low free acid content. I have found, for example, that the factor of acidity, as defined below, of a solution obtained as an effluent from treatment with a cation exchange resin in the sodium form attains even negative values, such cuts being remarkably stable and suitable for recovery of titanium values or for blending with other effluents as described above.

Suitable cation exchange resins that are applicable in the process of this invention are those of an acid character modified by containing a cation substituted for the hydrogen cation, of the group identified above. The resins, usually in the sodium form, are those containing as an integral part thereof, nuclear sulfonic, —$SO_3H$, methylene sulfonic, —$CH_2SO_3H$, carboxylic, —COOH, phenolic, —OH groups and the like. All of these resins are available commercially and are supplied in either the hydrogen or sodium form. The sulfonic acid type resin is preferred herein. The polymeric portion of the resin is cross-linked and the solubility of the resin structure is negligible. Thus, the cation exchange resins that are applicable in the process of this invention are water-insoluble and acid-resistant cross-linked resins that are chemically stable and which preferably undergo a minimum of degradation during use.

A nuclear sulfonic cation exchange resin can be prepared by the sulfonation with sulfuric acid of a copolymer prepared from a mixture of styrene and divinyl benzene. Such a resin is described in U.S. Patent No. 2,366,007. The resin can be readily converted to a particular ionic specie falling within the scope of this invention by treating it with a chloride salt solution of the cation or equivalent. For example, sodium chloride, potassium chloride, ammonium chloride, etc., solutions can be used to convert the resins to the ammonium, potassium or sodium forms. Reference is also made here to the description of the fundamental properties of such nuclear sulfonic cation exchange resins in Ind. and Eng. Chem., 39, 2830 (November 1947). Additionally, Kunin and Myers, in "Ion Exchange Resins," 1950, J. Wiley and Sons, Inc., pages 54 to 57, describe the preparation of sulfonic acid and carboxylic-type cation exchange resins.

Several cation exchange resins are available commercially under the following trade names: Amberlite IR-120, Dowex 50; Wofatit P, K and Ks; Zeo Rez: Permutit H; and Nalcite HGR. The "Dowex" and "Nalcite" resins are of the sulfonic acid type. The solution to be passed through the cation exchange resin for the purpose of selectively exchanging undesired metallic cation impurities can be taken from one of the steps of a titanium dioxide manufacturing plant. The sulfuric acid solution is taken from the acid attack of the raw titanium-bearing ore after dissolution of the digestion cake in aqueous media. In this specification, this acid solution is referred to as a "black sulfuric acid" whether it has been further treated to clarify it or not. The settled liquor, after the bulk of suspended solids have been removed, can be treated by the cation exchange resin in accordance with this invention. It should be understood, however, that even the unsettled liquor can be used as the charge to the cation exchange resin bed if desired, although other problems may be encountered by virtue of the undissolved and/or suspended solids in the liquor or solution. By this procedure, there can be eliminated various conventional steps in the process, viz., the ferric iron reduction step and clarification operation, since by treatment with the resin, there is obtained a substantially modified solution comprising the titanium values and sodium bi-sulfate (or other alkali bi-sulfate) and which after suitable adjustment of concentration is more suitable for hydrolysis or for the recovery of titanium.

In a preferred embodiment of my invention, an aqueous sulfuric acid solution comprising all the metallic values from the acid digestion step, or equivalent, is contacted with a suitable quantity of a cation exchange resin in the sodium form at ordinary temperatures and for one or more cycles in order to exchange substantially all the undesired metallic impurities. Effluent acid solutions of a low acid concentration can be recovered, especially in a continuous cycling process, which solutions are very stable. The solutions contain substantially all of the titanium values originally present in the charge material and sodium bi-sulfate. These solutions can be treated to recover the titanium, e.g. by thermal or chemical hydrolysis.

In the above aspect of my invention, I prefer to employ a stable water-insoluble nuclear sulfonic acid resin of high acid srength (e.g., R—$SO_3Na$) adaptable for operation at high flow rates.

In an alternate embodiment of this invention, effluent acid solutions from passage through a cation exchange resin in the hydrogen form of black sulfuric acid solutions, can be further blended with solutions obtained as effluents in the process of this invention to adjust the factor of acidity of the solutions to obtain an acid solution suitable for hydrolysis and recovery of titanium as $TiO_2$.

By employing the resin in the potassium form, I can obtain an effluent acid solution which on saturation with HCl precipitates $K_2TiCl_6$. The $K_2TiCl_6$ can thereafter be heated to dissociate it to KCl and $TiCl_4$ and the $TiCl_4$, after purification, can be hydrolyzed with steam for $TiO_2$ recovery and salvage of HCl.

It should also be understood that the exact mechanics of the exchange kinetics occurring in the process of my invention are not completely known, and I do not deem it necessary to offer any explanation thereof. I have found, however, that I can recover about 96% of the titanium values from a black sulfuric acid liquor, by treating said liquor in accordance with the process described.

In actual practice of either embodiment of my invention, I have employed flow rates of about 10 ml. per 1 to 2 minutes in a six-foot column of one-inch diameter containing a five-foot bed of a cation exchange resin. Higher or lower flow rates can, of course, be used, as is well known in the art. Also, I have found that I can employ ordinary room temperatures, that is, it is not necessary to heat the influent material or cation exchange resin, although such modification of operation procedures is considered well within the scope of my invention. Suffice it to say that I have used flow rates and temperatures known in the literature and have successfully exchanged metallic impurities from impure or contaminated sulfuric acid solutions of sulfuric acid concentration of up to 25% and higher without causing noticeable damage to the resinous material and still effect purification by ion exchange.

In operating in accordance with my process, I have introduced the influent material from the bottom of the column and have regenerated the resin by introducing the regenerant material from the top of the column. The reverse process or combination is also adaptable as well as rotation of the columns.

For the best results obtainable in a process of this nature, I have found that by employing a plurality of columns in a continuous cycling process, I can expedite the operation, while at the same time obtain a more efficient removal of interfering metallic cations from the contaminated solutions. The number of columns employed is a function of product quality and the number of spare columns required is dependent on rate during exhaustion and on time required for regeneration.

In the regeneration cycle where the cation exchange resin has been employed in the sodium form, I have used a solution of sodium chloride and have used an amount on the order of 920 gr. of a 24% NaCl solution as a total regenerant to regenerate a nuclear sulfonic cation exchange resin column of a volume of .0273 cu. ft. which has been exhausted with from about 300 to 450 ccs. of black sulfuric acid.

Although I have employed a sodium chloride solution for regenerating an exhausted resin, potassium chloride or other alkali metal, ammonium or magnesium solutions can be used for regenerating the resin depending on the form of the resin desired. The sulfate salts of these elements can also be used. The advantages of regenerating with a sodium chloride solution should be obvious in view of the cost of the salt.

In continuous recycling process wherein the effluent liquid from a black liquor treatment is recycled through several columns, I obtain a product which demonstrates the results and efficiency of the process of this invention. Also, the effluent from the regeneration is rich in impurities, metal sulfates, originally the undesirable impurities in the black liquor. Since the regenerant effluent solutions contain less free acid compared say, to similar solutions obtained with a cation exchange resin in the hydrogen form, the complication in the recovery of such impurities is lessened considerably. Cycle handling is preferred over use of one long bed to obtain maximum resin life and efficiency.

In order that some of the terminology used in illustrating the process of my invention, as shown in the examples, be more fully understood, the following are general statements regarding such: Free acid means the acid present, uncombined, in contrast to that present as combined salts. The free acid is not easily determined, since in some instances unstable salts will hydrolyze or the acid exists as a loose combination with salts or in complex forms. Total acid will include acid combined in salts hydrolyzed at a pH of 7.0, but not neutral salts such as Na, K, Mg, etc. In my results, I have used a pH to 3.9 as an indication of free acid (including that combined with $TiO_2$ for $H_2SO_4$ solutions). Acid values of from pH 3.9 to 7.0, I consider as acid salts.

The factor of acidity as used in this specification is based on the free acid, that is, non-combined acid, and the acid equivalent of the $TiO_2$, assuming one mole of $H_2SO_4$ per mole of $TiO_2$, expressed as percent. The factor of acidity is a well-known term of art in the production of titanium sulfate solutions and it is shown in U.S. Patent 2,298,032. Since the factor of acidity of an acid titanium sulfate solution should not be high for hydrolysis purposes, it can be appreciated that I provide a ready solution to this requirement by the treatment of solutions as defined above with cation exchange resins as noted. Thus, I have been able to obtain solutions of acid concentrations which are indeed low, for example, an average factor of acidity of 10 with individual cuts as low as −50 factor of acidity.

For the purpose of illustrating my invention, the treatment of a black liquor assaying typically as shown below will be used in the examples:

BLACK LIQUOR ANALYSIS

| | |
|---|---|
| Specific gravity | 1.4826 at 24° C. |
| $TiO_2$, g./l | 179.9 |
| Total iron, g./l | 39.9 |
| $Al_2O_3$, g./l | 12.5 |
| MgO, g./l | 13.6 |
| $R_2O_3$, [1] g./l | 250.0 |
| Total oxides | 258.5 |
| Acid ($H_2SO_4$) total to pH 3.9, percent | 21.3 |

[1] $R_2O_3$—quantity of material resulting from precipitation by $NH_4OH$ and ignition at 1000° C. to constant weight.

The following are examples of my invention. In the column captions of the following tables the volume of a particular cut or fraction is measured in cubic centimeters, the density of the cut in grams per milliliter, the $TiO_2$ and Fe concentrations in grams per liter, and the term "FA" stands for Factor of Acidity.

In Example 1 below, a black liquor (1.36 liters) assaying typically as above was passed through a column containing a cation exchange resin in the sodium form and individual cuts taken and analyzed as indicated.

*Example 1*

| Influent | Cut | Vol. | Density | Percent free $H_2SO_4$ | G./l. $TiO_2$ | G./l. Fe | Percent FA [1] | Disposition |
|---|---|---|---|---|---|---|---|---|
| 1.36 l. black solution | 1 | 110 | 1.13 | 1.61 | 52.0 | 1.83 | (−50.8) | Recycle. |
| | 2 | 115 | 1.35 | 6.88 | 121.5 | 1.91 | (−22.0) | Do. |
| | 3 | 109 | 1.46 | 9.86 | 153.0 | 3.08 | 0.9 | Do. |
| | 4 | 122 | 1.51 | 13.02 | 167.7 | 11.70 | 24.8 | Do. |
| | 5 | 112 | 1.48 | | | | | Do. |
| | 6 | 106 | 1.50 | 22.05 | 179.2 | 41.7 | 95.0 | Do. |
| | 7 | 110 | 1.49 | | | | | Do. |
| | 8 | 109 | 1.49 | 21.80 | 175.2 | 45.2 | 107.0 | Do. |
| | 9 | 85 | 1.50 | | | | | Do. |
| | 10 | 112 | 1.49 | 21.53 | 179.9 | 45.5 | 96.0 | Do. |
| | 11 | 111 | 1.50 | | | | | Do. |
| | 12 | 113 | 1.49 | 22.45 | 167.0 | 45.2 | 124.6 | Discard. |
| | 13 | 117 | 1.41 | | | | | Do. |
| | 14 | 118 | 1.26 | | | | | Do. |
| | 15 | 116 | 1.11 | | | | | Do. |
| | 16 | 112 | 1.0 | | | | | Do. |

[1] Neglecting Fe.

The cuts indicated as being held for recycle were recycled in order to determine how low the iron content would go on such solutions, i.e. to determine the degree to which the resin could reduce the iron in the solution.

Thus from the effluent cuts noted above, I can take effluent material as demonstrated by cuts 1 through 3 and blend these with effluent solutions from a cation exchange resin in the hydrogen form, say, effluent solution of a factor of acidity of from 65 to 80, to obtain solution of a high titanium content and more suitable for hydrolysis. It will be appreciated that a system can be provided comprising a battery of cation exchange resin columns in the alkali and hydrogen form whereby effluent solutions from the columns can be blended to give solutions best suited for hydrolysis.

Thus by virtue of this method of operation, that is a continuous cycling process, a series of columns containing cation exchange resin in the hydrogen form and also in the cationic form disclosed herein, can be set up so that a black sulfuric acid solution from treatment of a raw titanium bearing ore can be divided and passed through (a) a column in the hydrogen form, (b) a column in the sodium form and (c) the two separate streams obtained from treatments a and b, respectively, can be blended to produce an effluent product containing optimum properties for hydrolysis. It will be appreciated by those skilled in the art that the manipulations of such a system are only limited by the characteristics of the product desired.

One of the unique features of the process of this invention is the preparation of titanium tetrachloride from effluent solutions from the passage of a black sulfuric acid solution, or other effluents as defined above, through a cation exchange resin in the potassium form. Thus, it is within the scope of this invention: (a) to pass such a solution through a series of columns containing a resin in the potassium form; (b) recover effluent solutions which comprise essentially the titanium values, $H_2SO_4$ and postassium bisulfate; (c) treat said solutions with hydrogen chloride and potassium chloride from a recycled product (see below), such treatment precipitating potassium chlorotitanate which can be separated and heated to decomposition temperatures of the order of 300 to 500° C. to produce titanium tetrachloride and potassium chloride (the latter being recycled to the black solution treatment as noted above); (d) treat the titanium tetrachloride with steam to hydrolyze the product to rutile yielding $TiO_2$; (e) to recover hydrochloric acid from such hydrolysis; (f) recycle said hydrochloric acid to the potassium chlorotitanate precipitation step; and finally (g) recover sulfuric acid and hydrochloric acid from the precipitated potassium chlorotitanate for reuse of the sulfuric acid and recycle of the hydrogen chloride. In this embodiment of the invention, all by-products are recovered and reused within the process.

From the above example it can be appreciated that even in a single pass, i.e. the solution being passed once through a resin column as described heretofore, the effluent cuts obtained demonstrate the novel results of this treatment.

Examples 2 and 3 below show the regeneration of two column runs after passage of a black solution as in Example 1. Regeneration shows the large amount of iron retained by the resin.

*Example 2*

| Influent | Effluent | | | | | | |
|---|---|---|---|---|---|---|---|
| | Cut | Vol. | Density | Percent free acid as $H_2SO_4$ [1] | G./l. $TiO_2$ | G./l. Fe | Disposition |
| 700 ml. $H_2O$ 220 gr. NaCl | A | 109 | 1.04 | 4.91 | 2.4 | 12.6 | Hold for recycle. |
| | B | 108 | 1.09 | 9.01 | 4.4 | 27.4 | Do. |
| | C | 113 | 1.14 | 6.06 | | 43.1 | Do. |
| | D | 114 | 1.15 | 7.24 | 6.4 | 33.9 | Do. |
| | E | 118 | 1.17 | 3.62 | | 11.8 | Do. |
| | F | 117 | 1.17 | 2.24 | 3.6 | 6.1 | Do. |
| | G | 117 | 1.18 | 1.16 | | 3.1 | Do. |
| | H | 109 | 1.17 | 1.11 | 2.0 | | Do. |

[1] Probably present as HCl.

In Example 3 below, cuts B through H of Example 2 were recycled to the column.

*Example 3*

| Influent | Effluent | | | | | | |
|---|---|---|---|---|---|---|---|
| | Cut | Vol. | Density | Percent free acid as $H_2SO_4$ [1] | G./l. $TiO_2$ | G./l. Fe | Disposition |
| B | | | | | | | |
| C | | | | | | | |
| D | | | | | | | |
| E | | | | | | | |
| F | | | | | | | |
| G | | | | | | | |
| H | | | | | | | |
| 700 ml. $H_2O$ 220 gr. salt (NaCl) | 1 | 118 | 1.07 | 5.31 | 4.7 | 14.5 | Hold for recycle. |
| | 2 | 103 | 1.10 | 4.84 | 6.1 | 25.4 | Do. |
| | 3 | 112 | 1.13 | 6.57 | 6.6 | 45.7 | Do. |
| | 4 | 117 | 1.14 | 6.84 | 6.7 | 42.3 | Do. |
| | 5 | 115 | 1.15 | 7.38 | | 43.3 | Do. |
| | 6 | 114 | 1.15 | 7.88 | 8.4 | 31.8 | Do. |
| | 7 | 111 | 1.16 | 6.08 | | 20.8 | Do. |
| | 8 | 114 | 1.17 | 3.59 | 7.8 | 5.4 | Do. |
| | 9 | 116 | 1.16 | 2.55 | | 5.2 | Do. |
| | 10 | 113 | 1.17 | 2.01 | 3.0 | 8.4 | Do. |
| | 11 | 119 | 1.14 | 2.21 | 2.4 | 6.1 | Do. |

[1] Probably present as HCl.

It will be noted that in a continuous cycling process as envisaged by this process, black sulfuric acid can be added continuously to columns on stream in conjunction with the recycle effluent from previous columns.

The feed for Example 4 was taken from effluent cuts 1 through 12 of the solution passed through the column in Example 1. The low FA values are readily apparent in those cuts containing low iron and high titanium values.

In Examples 4, 5 and 7, the column contains cation exchange resin in the sodium form.

Example 4

| Influent | Cut | Vol. | Density | Percent free H₂SO₄ | G./l. TiO₂ | G./l. Fe | Percent FA¹ | Disposition |
|---|---|---|---|---|---|---|---|---|
| 1 | | | | | | | | |
| 2 | | | | | | | | |
| 3 | | | | | | | | |
| 4 | | | | | | | | |
| 5 | 0 | 113 | 1.02 | 1.89 | 4.0 | (²) | 303.3 | Hold for recycle. |
| 6 | 1 | 125 | 1.06 | 4.81 | 30.0 | (²) | 51.1 | Do. |
|  | 2 | 107 | 1.20 | 7.45 | 88.8 | 0.25 | 5.1 | Do. |
| 7 | 3 | 112 | 1.34 | 5.62 | 118.8 | 1.15 | (−21.2) | Hold for recycle. |
| 8 | 4 | 115 | 1.45 | 9.01 | 152.0 | 3.70 | (−4.2) | Do. |
| 9 | 5 | 110 | 1.49 | 10.79 | 162.0 | 3.55 | 3.6 | Do. |
| 10 | 6 | 110 | 1.49 | 12.82 | 171.2 | 4.19 | 21.0 | Do. |
| 11 | 7 | 99 | 1.48 | | | | | Do. |
| 500 ml. black solution | 8 | 106 | 1.50 | 16.50 | 178.0 | 5.96 | 50.5 | Do. |
|  | 9 | 112 | 1.50 | 17.90 | | 31.7 | | Do. |
|  | 10 | 116 | 1.49 | 19.89 | 180.0 | 39.0 | 92.1 | Do. |
|  | 11 | 116 | 1.59 | | | | | Do. |
| 12 | 12 | 114 | 1.49 | 21.15 | 179.6 | 43.9 | 107.9 | Do. |
|  | 13 | 115 | 1.52 | | | | | Do. |
|  | 14 | 113 | 1.49 | 21.19 | 181.2 | 44.6 | 107.8 | Do. |
|  | 15 | 122 | 1.49 | 20.98 | 171.2 | 42.8 | 111.3 | Discard. |
|  | 16 | 80 | 1.36 | | | | | Do. |
|  |  | 119 | 1.31 | | | | | Do. |
|  |  | 118 | 1.20 | | | | | Do. |
|  |  | 105 | 1.02 | | | | | Do. |
|  |  | 108 | 1.01 | | | | | Do. |

¹ Neglecting Fe.  ² Absent.

The influent charge to the column of Example 5 below was taken from effluent cuts 1 through 15 of Example 4 and comprises solutions which can be passed through the cation exchange resin column for a third time.

Example 5

| Influent | Cut | Vol. | Density | Percent free H₂SO₄ | G./l. TiO₂ | G./l. Fe | Percent FA¹ | Disposition |
|---|---|---|---|---|---|---|---|---|
| 1 | | | | | | | | |
| 2 | | | | | | | | |
| 3 | | | | | | | | |
| 4 | Y | 117 | 1.01 | 2.05 | | | | Hold for recycle. |
| 5 | | | | | | | | Do. |
| 6 | 1 | 115 | 1.05 | 4.86 | 32.4 | (²) | 54.5 | Do. |
| 7 | 2 | 105 | 1.17 | 6.54 | 83.6 | .05 | 2.7 | Do. |
| 8 | 3 | 105 | 1.27 | 4.72 | 107.2 | .51 | (−16.9) | Do. |
| 9 | 4 | 108 | 1.34 | 7.99 | 128.4 | .60 | 0.9 | Do. |
| 10 | 5 | 110 | 1.42 | 10.53 | 146.4 | .80 | 19.1 | Do. |
| 11 | 6 | 115 | 1.48 | 10.43 | 158.8 | 1.17 | 12.7 | Do. |
| 12 | 7 | 104 | 1.51 | 11.50 | 168.8 | 2.88 | 15.9 | Do. |
| 13 | 8 | 114 | 1.51 | 13.09 | 177.2 | 3.01 | 16.0 | Do. |
| 14 | 9 | 113 | 1.51 | 13.84 | 173.9 | 4.80 | 33.6 | Do. |
| 15 | 10 | 112 | 1.51 | 14.87 | 175.8 | 10.2 | 44.2 | Do. |
| 600 ml. black solution | 11 | 110 | 1.51 | | | | | Do. |
|  | 12 | 113 | 1.51 | 19.27 | 178.0 | 30.1 | 88.1 | Do. |
|  | 13 | 96 | 1.50 | | | | | Do. |
|  | 14 | 111 | 1.51 | 20.25 | 179.0 | 40.4 | 104.5 | Do. |
|  | 15 | 113 | 1.51 | | | | | Do. |
|  | 16 | 113 | 1.49 | 20.70 | 181.6 | 42.2 | 104.3 | Do. |
|  | 17 | 112 | 1.49 | | | | | Do. |
|  | 18 | 118 | 1.50 | 21.20 | 177.4 | 44.1 | 111.2 | Do. |
|  | 19 | 123 | 1.48 | | | 43.5 | | Discard. |
|  |  | 97 | 1.35 | | | | | Do. |
|  |  | 105 | 1.30 | | | | | |

¹ Neglecting Fe.  ² Absent.

The column after the exhaustion run of Example 5 was ready for regeneration. Regeneration of this column is advantageously accomplished by employing fresh regenerating solution or the effluent from the regeneration of the column of Example 4. The results are shown below with this latter effluent and added salt solution.

The above examples illustrate the passage of a black sulfuric acid solution through a cation exchange resin in the sodium form. Example 8 below shows the passage of 6th pass effluent solutions from a cation exchange resin in the hydrogen form. Example 8 is identical with Example 11 of my co-pending application referred to herein and is presented to show for comparison the difference in factor of acidity between some of the effluent cuts obtained by the process of this invention and those of my co-pending application.

*Example 6*

| Influent | Effluent | | | | | | |
|---|---|---|---|---|---|---|---|
| | Cut | Vol. | Density | Percent free acid as $H_2SO_4$ | G./l. $TiO_2$ | G./l. Fe | Disposition |
| B | | | | | | | |
| C | | | | | | | |
| D | | | | | | | |
| E | | | | | | | |
| F | | | | | | | |
| G | | | | | | | |
| H | | | | | | | |
| I | A | 117 | 1.04 | | | | Recover. |
| J | B | 108 | 1.09 | 7.02 | 5.3 | 30.9 | Do. |
| K | C | 108 | 1.12 | | | | Do. |
| 905 ml. salt solution | D | 113 | 1.14 | 6.47 | 6.0 | 52.8 | Do. |
| | E | 113 | 1.15 | | | | Do. |
| | F | 105 | 1.14 | 7.50 | 6.0 | 53.5 | Recover recycle. |
| | G | 112 | 1.14 | 7.88 | 6.8 | 45.4 | Do. |
| | H | 109 | 1.15 | 8.05 | 7.1 | 28.4 | Do. |
| | I | 115 | 1.15 | | | | Do. |
| | J | 112 | 1.16 | 4.28 | 5.3 | 9.5 | Do. |
| | K | 116 | 1.16 | | | | Do. |
| 1 liter 2% $H_2SO_4$ | L | 118 | 1.16 | 2.46 | 3.5 | 5.3 | Do. |
| | M | 111 | 1.17 | | | | Do. |
| | N | 115 | 1.16 | 1.05 | 0.64 | 2.9 | Do. |
| | O | 114 | 1.17 | | | | Do. |
| | P | 114 | 1.17 | 0.50 | 1.31 | 4.3 | Do. |
| | Q | 120 | 1.14 | | | | Do. |
| | | 117 | 1.04 | | | | Discard. |

[1] Probably present as HCl.

In Example 6 there is indicated the recovery of regenerant solution, high in iron values, for further disposition.

Example 7 below shows a further exhaustion pass with effluent from the pass of Example 5. Note the substantial absence of iron and low factor of acidity in the first 450 or so milliliters of solution.

*Example 7*

| Influent | Effluent | | | | | | | |
|---|---|---|---|---|---|---|---|---|
| | Cut | Vol. | Density | Percent free $H_2SO_4$ | G./l. $TiO_2$ | G./l. Fe | Percent FA[1] | Disposition |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | Z | 109 | 1.02 | | | | | |
| 9 | 1 | 106 | 1.07 | 6.30 | 40.2 | ([2]) | 62.0 | |
| 10 | 2 | 110 | 1.20 | 5.50 | 86.3 | .73 | (−15.1) | |
| 11 | 3 | 113 | 1.29 | 5.54 | 114.7 | .57 | (−16.0) | |
| 12 | 4 | 118 | 1.34 | 8.18 | 125.4 | 1.03 | (−4.9) | |
| 13 | 5 | 114 | 1.41 | 11.30 | 151.8 | 0.85 | 19.1 | |
| 14 | 6 | 104 | 1.47 | 11.97 | 164.0 | 1.63 | 15.9 | |
| 15 | 7 | 108 | 1.49 | 11.87 | 165.4 | 2.40 | 21.0 | |
| 16 | 8 | 106 | 1.49 | 12.72 | 163.5 | 3.11 | 19.1 | |
| 17 | 9 | 112 | 1.49 | 13.77 | 168.8 | 4.98 | 35.7 | |
| 18 | 10 | 107 | 1.49 | 15.21 | 173.2 | 7.86 | 38.4 | |
| 19 | 11 | 115 | 1.50 | | | 12.0 | | |
| 500 ml. black solution | 12 | 114 | 1.50 | 17.18 | 179.2 | 20.3 | 67.5 | |
| | 13 | 112 | 1.50 | | | | | |
| | 14 | 109 | 1.50 | 20.12 | 179.9 | 38.7 | 92.5 | |
| | 15 | 116 | 1.49 | | | | | |
| | 16 | 114 | 1.50 | 21.34 | 180.8 | 41.6 | 102.0 | |
| | 17 | 113 | 1.49 | | | | | |
| | 18 | 114 | 1.49 | 21.59 | 180.6 | 42.0 | 105.0 | |
| | 19 | 119 | 1.49 | 21.95 | 183.6 | 42.9 | 109.2 | |
| | 20 | 115 | 1.44 | 20.79 | 154.9 | 40.0 | 120.0 | |
| | 21 | 115 | 1.31 | 18.43 | 90.2 | 27.7 | 375.8 | |
| | 22 | 109 | 1.14 | 11.45 | 30.5 | 12.1 | 330.3 | |
| | 23 | 114 | 1.01 | 2.63 | 2.8 | 1.3 | 769 | |
| | 24 | 110 | 1.01 | 1.59 | 1.1 | 0.4 | 1,250 | |

[1] Neglecting Fe.  [2] Absent.

Example 8

| Influent | Effluent | | | | | | | Disposition |
| --- | --- | --- | --- | --- | --- | --- | --- | --- |
| | Cut | Vol. | Density | Percent free $H_2SO_4$ | G./l. $TiO_2$ | G./l. Fe | Percent FA[1] | |
| 5 | | | | | | | | |
| 6 | | | | | | | | |
| 7 | | | | | | | | |
| 8 | | | | | | | | |
| 9 | 1 | 1,300 | 1.03 | | | | | Hold. |
| 10 | | | | | | | | Do. |
| 11 | 2 | 2,400 | 1.08 | | | | | Do. |
| 12 | 3 | 2,400 | 1.09 | 13.80 | 2.0 | 0.25 | 6,216 | Recycle. |
| 13 | 4 | 2,400 | 1.13 | 16.99 | 16.0 | | 910 | Do. |
| 14 | 5 | 2,400 | 1.24 | 21.05 | 90.8 | 0.22 | 156 | Product. |
| 15 | 6 | 2,400 | 1.30 | | | | | Do. |
| 16 | 7 | 2,400 | 1.34 | 22.23 | 166.8 | 0.14 | 69.6 | Do. |
| 17 | 8 | 2,400 | 1.35 | | | | | Do. |
| 18 | 9 | 2,400 | 1.35 | 22.87 | 185.6 | 0.16 | 58.1 | Recycle. |
| 19 | 10 | 2,400 | 1.35 | | | | | Do. |
| 20 | 11 | 2,400 | 1.35 | 23.43 | 184.5 | 0.84 | 65.0 | Do. |
| 21 | 12 | 2,400 | 1.36 | | | | | Do. |
| 22 | 13 | 2,400 | 1.36 | 24.06 | 180.0 | 1.02 | 72.1 | Do. |
| 23 | 14 | 2,400 | 1.36 | | | | | Do. |
| 24 | 15 | 2,400 | 1.35 | 24.39 | 164.0 | 0.83 | 89.9 | Do. |
| 25 | 16 | 2,400 | 1.36 | | | | | Do. |
| | 17 | 2,400 | 1.36 | 26.77 | 162.4 | 1.38 | 106.1 | Do. |
| | 18 | 2,400 | 1.36 | | | | | Do. |
| | 19 | 1,400 | 1.36 | 27.00 | 159.2 | 1.35 | 110.3 | Do. |
| 26 | 20 | 2,400 | 1.36 | | | | | Do. |
| 27 | 21 | 2,400 | 1.36 | 26.70 | 159.2 | 1.63 | 117.9 | Do. |
| 28 | 22 | 2,400 | 1.37 | | | | | Do. |
| Bulk | 23 | 2,400 | 1.36 | 27.00 | 154.4 | 3.36 | 125.7 | Do. |
| | 24 | 2,400 | 1.37 | | | | | Do. |
| | 25 | 2,400 | 1.37 | 26.71 | 155.0 | 8.70 | 123.5 | Do. |
| | 26 | 2,400 | 1.37 | | | | | Do. |
| | 27 | 2,400 | 1.37 | 26.61 | 156.3 | 8.89 | 120.9 | Do. |
| 10 liters black solution | 28 | 2,400 | 1.37 | | | | | Do. |
| | 29 | 2,300 | 1.37 | 26.80 | 155.0 | 10.88 | 124.0 | Do. |
| | 30 | 2,400 | 1.38 | | | | | Do. |
| | 31 | 2,400 | 1.38 | 26.10 | 157.5 | 13.11 | 120.0 | Do. |
| | 32 | 2,400 | 1.38 | | | | | |
| | Li-7 | 14,900 | 1.44 | 19.69 | 162.5 | 38.6 | 106.2 | |

[1] Neglecting Fe.

An advantageous feature of this invention is the provision of a continuous method of operation by a plurality of columns so that solutions to be treated can be introduced into one column in a battery or system, say of at least two such columns. In such an operation, a solution to be treated is introduced into one zone of a cation exchange resin column system while from another zone of the multiple column system, effluent solution is withdrawn therefrom and then introduced into another zone so that in essence, one charge of black sulfuric acid liquor is passed, on at least an average, through two such cation exchange resin columns. While one column is being exhausted in such a multiple column operation, at least one other column can be in the process of regeneration. The regenerant liquor and effluent can be manipulated much like the initial charge of black liquor to the column(s) e.g. recycled, recovered, etc.

From the above description and specific examples of this invention, it will be appreciated that I have provided a unique method for obtaining solutions which can be more readily prepared for hydrolysis, either thermally or chemically. Some of the advantages are: (1) With a lower factor of acidity of the treated solution, higher thermal hydrolysis rates and recovery can be expected. In chemical hydrolysis there will be reduced alkali, washing and volume requirement; (2) The cost of the materials will be greatly reduced, for example, the resin can be regenerated with a simple sodium chloride solution which is a lot cheaper than a hydrochloric acid solution. Corrosion problems will be minimized and by-products such as iron, aluminum, vanadium can be salvaged, if this desire ever arises. The method of this invention also permits the retention of a substantial portion of present sulfate process equipment for adaptability to all kinds of raw material while delivering superior chloride process quality at lower costs. Other advantages can be realized by the use of potassium instead of sodium as described above.

Although I have emphasized the use of the cation exchange resin in the potassium form for the purpose of recovering an effluent solution of potassium bisulfate and titanium which upon saturation with hydrogen chloride precipitates potassium chlorotitanate ($K_2TiCl_6$), a cation exchange resin in the form of the other alkali metals (sodium, rubidium, cesium and lithium) as well as ammonium and magnesium can also be used for the same purpose. The potassium, sodium, lithium, ammonium or magnesium chlorotitanate precipitates obtained by the process of this invention can be recovered, and heated (at temperatures of from 300° to 500° C.) to decompose to titanium tetrachloride and the chloride of the particular exchanging cation of the resin. As noted, however, the use of the cation exchange resin in the potassium form is preferred for this process.

Resort can be made to modifications falling within the spirit of this invention and the scope of the claims.

I claim:

1. A process for purifying a sulfuric acid-containing feed solution having metallic solutes which consist essentially of tetravalent titanium values and at least one associated metallic impurity with a valency state below 4, the associated metallic impurity being selected from the group consisting of iron, aluminum, calcium, cobalt, chromium, copper, magnesium, manganese, molybdenum, nickel, vanadium, zinc, and zirconium, which comprises contacting said feed solution with a water-insoluble, acid-resistant cation exchange resin containing as the exchanging cation a cation selected from the group consisting of the alkali metals, magnesium, and ammonium, and recovering from contact with said resin as product a solution reduced in said associated metallic impurity and containing the bulk of said tetravalent titanium values.

2. The process of claim 1 wherein said feed solution is a black sulfuric acid solution obtained from the reaction of sulfuric acid with a titaniferous material selected from the group consisting of ore, slag, and mixtures thereof, the exchanging cation is a cation selected from the group consisting of sodium and potassium, and the product is a solution containing a bisulfate of the exchanging cation and substantially all of said titanium values.

3. The process of claim 2 wherein said exchanging cation is sodium.

4. The process of claim 2 wherein said exchanging cation is potassium.

5. The process of claim 1 wherein the cation exchange resin is maintained in a plurality of zones, and in at least one of said zones said ion exchange resin is being regenerated with an aqueous solution of a salt of the exchanging cation.

6. A process for simultaneously adjusting the acidity of and purifying a sulfuric acid feed solution obtained from the sulfuric acid treatment of titaniferous solids, said feed solution having metallic solutes which consist essentially of tetravalent titanium values and at least one associated metallic impurity with a valency state below 4, the associated metallic impuriy being selected from the group consisting of iron, aluminum, calcium, cobalt, chromium, copper, magnesium, manganese, molybdenum, nickel, vanadium, zinc, and zirconium, which process comprises contacting a part of said feed solution with a water-insoluble, acid-resistant cation exchange resin in a hydrogen form and withdrawing purified primary effluent therefrom reduced in said associated metallic impurities and containing the bulk of said titanium values in said part contacted; contacting another part of said feed solution with a water-insoluble, acid-resistant cation exchange resin containing as the exchanging cation a cation selected from the group consisting of the alkali metals, magnesium, and ammonium, and withdrawing purified second effluent therefrom reduced in said associated metallic impurities and containing the bulk of said tetravalent titanium values of said another part contacted; and blending at least a portion of said primary effluent with said second effluent, thereby forming a purified solution of tetravalent titanium values having acidity intermediate to each of said effluents prior to the blending.

7. The process of claim 6 wherein said sulfuric acid feed solution is obtained from the treatment of a titaniferous solid selected from the group consisting of ore, slag, and mixtures thereof; said primary effluent comprises a fraction enriched in free sulfuric acid and another fraction containing free sulfuric acid and the bulk of the tetravalent titanium values originally present in said part of the feed solution contacted with the cation exchange resin in hydrogen form; and at least one of said fractions is blended with said second effluent.

8. The process of claim 6 wherein said exchanging cation is sodium.

9. The process of claim 6 wherein said exchanging cation is potassium.

10. The process of claim 1 wherein the cation exchange resin used contains nuclear sulfonic groups and an equivalent amount of hydrogen and alkali metal exchanging cations.

References Cited in the file of this patent

UNITED STATES PATENTS

| | | |
|---|---|---|
| 2,298,032 | Bousquet et al. | Oct. 6, 1942 |
| 2,468,471 | Thurston | Apr. 26, 1949 |
| 2,589,909 | Weikel | Mar. 18, 1952 |
| 2,631,127 | D'Alelio | Mar. 10, 1953 |
| 2,671,714 | McIlhenny et al. | Mar. 9, 1954 |
| 2,857,242 | Schossberger | Oct. 21, 1958 |
| 2,857,243 | Schossberger | Oct. 21, 1958 |

OTHER REFERENCES

Kunin et al.: "Ion Exchange in the Atomic Energy Program," Industrial and Engineering Chem., vol. 48, No. 8, August 1956, pages 30A–35A.

Chem. Eng. Prog., "New Process for Titanium," vol. 53, No. 7, page 94 (July 1957).

Chem. Eng., page 131, May 5, 1958.

Industrial and Engineering Chemistry, "A New Process for Titanium," vol. 51, No. 5, pages 669–670 (May 1959).